United States Patent [19]

Hashimoto

[11] Patent Number: 5,321,523
[45] Date of Patent: Jun. 14, 1994

[54] IMAGE PROCESSING APPARATUS

[75] Inventor: Yasunori Hashimoto, Yokohama, Japan

[73] Assignee: Canon Kabushiki Kaisha, Tokyo, Japan

[21] Appl. No.: 758,214

[22] Filed: Sep. 12, 1991

Related U.S. Application Data

[63] Continuation of Ser. No. 321,078, Mar. 9, 1989, abandoned.

[30] Foreign Application Priority Data

Nov. 3, 1988 [JP] Japan .................................. 63-056303
Nov. 3, 1988 [JP] Japan .................................. 63-056304

[51] Int. Cl.$^5$ ............................................. H04N 1/40
[52] U.S. Cl. ............................... 358/455; 358/466
[58] Field of Search ............... 358/447, 448, 452, 456, 358/457, 458, 461, 462, 463, 464, 465, 466, 467, 429, 455

[56] References Cited

U.S. PATENT DOCUMENTS

| 4,414,581 | 11/1983 | Kato et al. | 358/456 |
| 4,554,593 | 11/1985 | Fox et al. | 358/464 |
| 4,686,579 | 8/1987 | Sakamoto | 358/466 |
| 4,723,173 | 2/1988 | Tanioka | 358/464 |
| 4,786,976 | 11/1988 | Takao et al. | 358/456 |
| 4,856,075 | 8/1989 | Smith | 358/443 |

FOREIGN PATENT DOCUMENTS

| 0153455 | 9/1983 | Japan | 358/456 |
| 0000270 | 1/1984 | Japan | 358/456 |

*Primary Examiner*—Mark R. Powell
*Assistant Examiner*—Grant, II., Jerome
*Attorney, Agent, or Firm*—Fitzpatrick, Cella, Harper & Scinto

[57] ABSTRACT

An image processing apparatus displaying an identification performance between the image of half-tone and an image of tone other than the half-tone includes a device for correcting the characteristics of the input image signal and an identifying device capable of identifying whether the input image signal is the half-tone image or not without use of the image signal whose characteristics have been corrected. In accordance with the result of the identification performed by this identifying device, an output image signal is selected.

47 Claims, 9 Drawing Sheets

|   |   |   |   |
|---|---|---|---|
| 7 | 7 | 7 | 7 |
| 6 | 2 | 4 | 7 |
| 6 | 6 | 5 | 7 |
| 7 | 7 | 7 | 7 |

FIG. 7

|   |   |   |   |
|---|---|---|---|
| 5 | 6 | 6 | 6 |
| 5 | 1 | 2 | 7 |
| 4 | 4 | 3 | 7 |
| 7 | 7 | 7 | 7 |

FIG. 8

|   |   |   |   |
|---|---|---|---|
| 3 | 4 | 4 | 5 |
| 3 | 1 | 1 | 5 |
| 3 | 2 | 2 | 6 |
| 7 | 7 | 6 | 6 |

FIG. 9

| 0 | 0 | 0 | 0 |
|---|---|---|---|
| 0 | 1 | 1 | 0 |
| 0 | 0 | 0 | 0 |
| 0 | 0 | 0 | 0 |

INPUT LEVEL : 4

NUMBER OF
BLACK PIXELS : 2

FIG. 10A

| 0 | 0 | 0 | 0 |
|---|---|---|---|
| 0 | 1 | 1 | 0 |
| 1 | 1 | 1 | 0 |
| 0 | 0 | 0 | 0 |

INPUT LEVEL : 4

NUMBER OF
BLACK PIXELS : 5

FIG. 10B

| 1 | 1 | 1 | 0 |
|---|---|---|---|
| 1 | 1 | 1 | 0 |
| 1 | 1 | 1 | 0 |
| 0 | 0 | 0 | 0 |

INPUT LEVEL : 4

NUMBER OF
BLACK PIXELS : 9

FIG. 10C

IMAGE PROCESSING APPARATUS

This application is a continuation of application Ser. No. 07/321,078, filed Mar. 9, 1989, now abandoned.

BACKGROUND OF THE INVENTION

1. Field of the Invention

The present invention relates to an image processing apparatus, and, more particularly, to an image processing apparatus capable of, for example, binary encoding entered data of an original image in which the binary image regions, such as characters, and half-tone image regions, such as photograph, are mixed.

2. Description of the Related Art

Hitherto, in the apparatus of the type described above, there has been a binary encoding apparatus capable of processing binary image information expressing, for example, documents, characters, and drawings and as well capable of processing multi-valued image information expressing half-tone image (one of the multi-valued information) information such as photograph or the like.

For example, in an apparatus capable of binary encoding multi-valued information, the binary image regions of the binary image information and the half-tone image regions of the half-tone image information are read from the original image by the image reader. Next, the image information transmitted from this image reader is processed by the following binary encoder. In this binary encoding portion, a image processing in accordance with the density of the entered image information is performed. In this case, the image information transmitted from the image reader has been subjected to a correction treatment in accordance with a information representing the characteristics of the output information, such as the density of the pixels or the contrast, and is expressed by the density level corresponding to the density of the pixels as data. The thus-transmitted image information from the image reader is then subjected to an identification treatment for distinguishing whether it is a character region or a photograph region. In this identification treatment, the differences between the density level of the subject and those of the pixels around the subject pixel are obtained. The identification for determining whether the subject region is a character region or a photograph region is performed by making comparison between the difference which shows the maximum level selected from the differences obtained as described above and a predetermined threshold.

However, in a case where the image reader transmits image information with the density level, the region which is in fact a photograph region can be mis-identified as a character region if a predetermined density difference is detected from the transmitted density level. That is, a problem can arise that the region which should be identified as a photograph region is erroneously detected to be a character region due to the large density level change thereof. Such erroneous identification causes the deterioration in the frame quality of the photograph region of the output image transmitted from a printer or the like.

The image information correction is performed in a forward stage in which operation of distinguishing between a character region and a photograph region is conducted. Therefore, a further problem arises if, for example, an intense contrast is set for the image reading portion, as a photograph portion whose density difference has been enlarged can be erroneously identified as a character region.

Furthermore, related disclosure assignment by the assignee of the present invention, is disclosures in U.S. Pat. Nos. 4,414,581, 4,786,916, 4,709,274, 4,701,807, 4,723,173, and 4,686,579, and in the continuation application of U.S. Ser. No. 611,124 filed May 17, 1984, U.S. Ser. No. 22,513 (application date Mar. 9, 1987), U.S. Ser. No. 682,346 (application date Dec. 17, 1984), U.S. Ser. No. 812,308 (application date Dec. 23, 1985), U.S. Ser. No. 819,132 (application date: Jan. 15, 1986), and U.S. Ser. No. 925,247 (application date: Oct. 31, 1986). However, further improvement has been desired.

SUMMARY OF THE INVENTION

To this end, an object of the present invention is to overcome the above-described problems experienced with the conventional techniques.

Another object of the present invention is to improve the image processing apparatus provided with the image identifying function.

Still another object of the present invention is to provide an image processing apparatus with which an output image exhibiting an excellent reproducibility of the original image and a significantly improved frame quality can be obtained.

A further object of the present invention is to provide an image processing apparatus with which an output image exhibiting an excellent reproducibility and a significantly improved frame quality can be obtained.

A further object of the present invention is to provide an image processing apparatus capable of identifying the image read from an original image in which the half-tone image and images other than the half tone image are mixed between the half-tone image and the non-half-tone image.

According to one aspect of the present invention is provided an image processing apparatus comprising:

input means for inputting an image signal;

correction means for correcting the characteristics of image signal inputted by the input means;

identifying means for identifying whether the image represented by the image signal inputted by the input means is half-tone image or not, wherein said identifying means identifies said image without using said image signal corrected by said correction means; and outputting means for outputting a reproduced image signal in accordance with the result of identification performed by said identifying means.

Another aspect of the present invention provided an image processing apparatus comprising:

first input means for inputting correction information of an image signal;

second input means for inputting the image signal; and binary encoding means for correcting the image signal inputted by the second input means in accordance with correction information inputted by the first input means and as well as converting the same into a false gradation signal in accordance with the thus-selected dither pattern (an n x n pixel matrix pattern).

Other features and advantages of the present invention will be apparent from the following detailed description of the preferred embodiment taken in conjunction with the accompanying drawings, in which like reference numbers designate the same or similar parts throughout the figures thereof.

BRIEF DESCRIPTION OF THE DRAWINGS

FIG. 7 is a view which illustrates a dither pattern in which thresholds having the input/output characteristics shown in FIG. 4 are arranged;

FIG. 8 is a view which illustrates a dither pattern in which thresholds having the input/output characteristics shown in FIG. 5 are arranged;

FIG. 9 is a view which illustrates a dither pattern in which thresholds having the input/output characteristics shown in FIG. 6 are arranged; and FIGS. 10A to 10C are views which illustrates the results of the output from the dither processing portion 12 which correspond to the several modes.

DESCRIPTION OF THE PREFERRED EMBODIMENTS

Figure 1A:
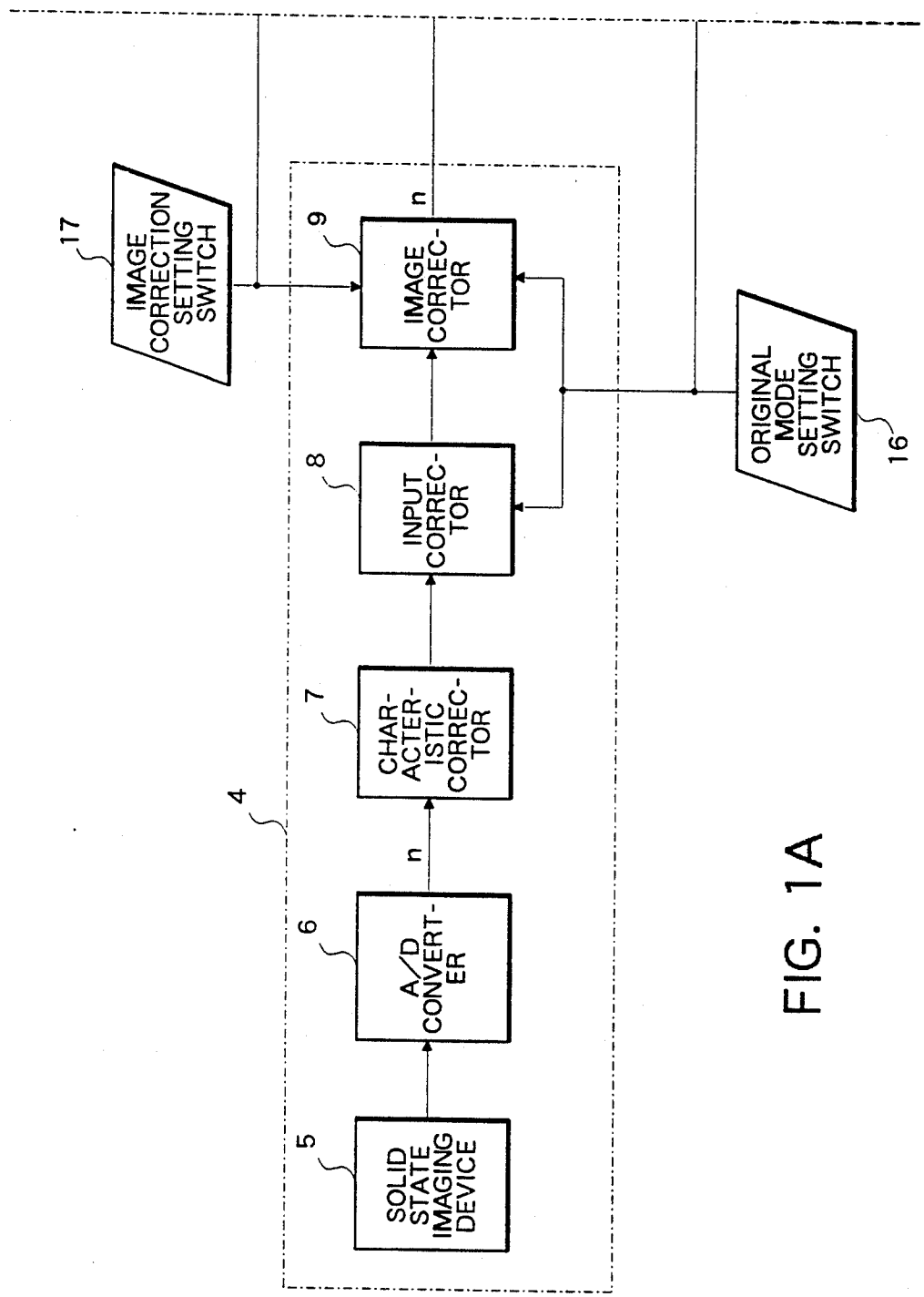
FIGS. 1A and 1B are block diagrams which illustrate an embodiment of an image processing apparatus.
Figure 1B:
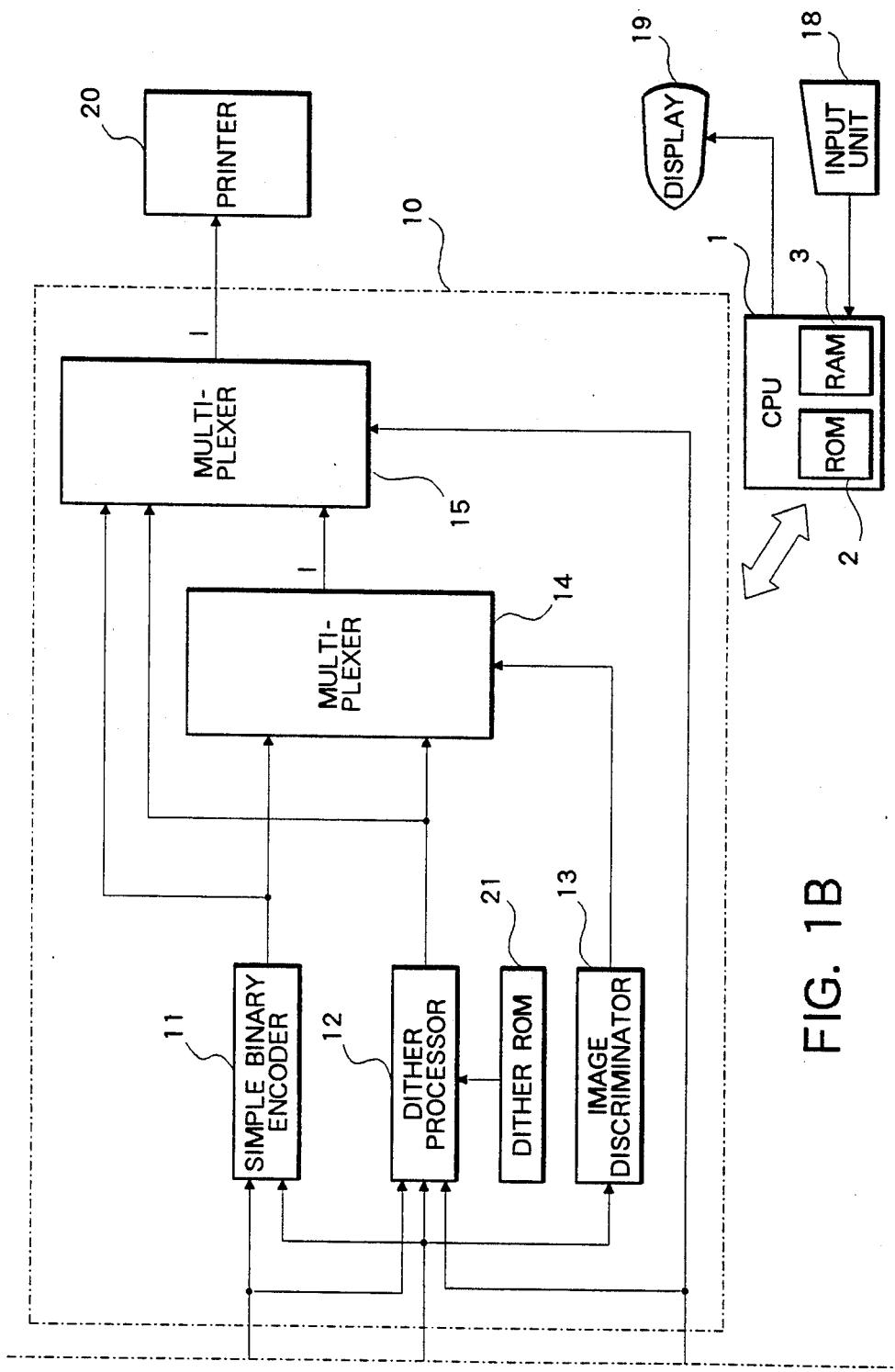

FIGS. 1A and 1B are block diagrams which illustrate the structure of an embodiment of an image processing apparatus.

Referring to FIGS. 1A and 1B, reference numeral 1 represents a CPU capable of controlling the operation of the overall apparatus in accordance with a variety of programs stored in a ROM 2. Reference numeral 2 represents the ROM 2 storing a control program, an error correction program, and a program for actuating the CPU 1 in accordance with the flow chart shown in FIG. 2A and FIG. 2B to be described hereinafter. Reference numeral 3 represents a RAM which serves as a work area during execution of the programs stored in the ROM 2 and as well serves as a temporary storage area for error correction data.

Figure 3:
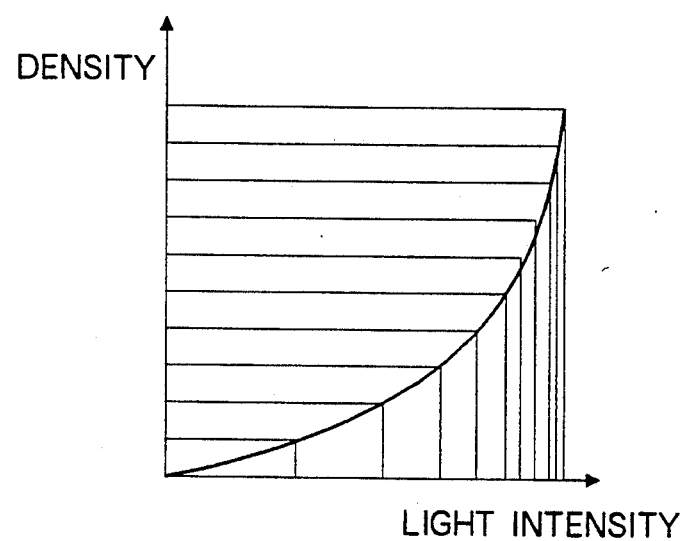
FIG. 3 is a view which illustrates a general characteristic upon light quantity-density conversion.

Reference numeral 4 represents an image reader capable of reading original image and correcting it in a predetermined manner. In the image reader 4, reference numeral 5 represents a solid-state imaging device. Reference numeral 6 represents an analog/digital converter (abbreviated as "A/D" hereinafter) capable of converting an analog signal (image information) supplied from the solid-state imaging device 5 into a digital signal (image information) of n bits. Reference numeral 7 represents a characteristic correction portion capable of correcting, in accordance with the dispersion of the individual sensitivity of the devices of the solid-state imaging device 5, digital signals supplied from the A/D converter 6. Reference numeral 8 represents an input correction portion capable of selecting for correction either an input/output characteristic to be converted from light quantity level to the density level or a linear input/output characteristic which has not been as yet converted in accordance with the digital signal transmitted from the characteristic correction portion 7. Next, the relationship between the light quantity level and the density level in the input correction portion 8 will be described. FIG. 3 illustrates general conversion characteristics from the light quantity to the density, wherein the light quantity level should be read along the axis of abscissas while the density level should be read along the axis of ordinates. The origin of the axis of abscissas and the axis of ordinates of each of the levels is arranged to express pure white. Furthermore, it is arranged such that the light quantity level shows a greater difference at positions in the vicinity of the pure white with respect to the density level.

Next, reference numeral 9 represents an image correction portion capable of giving a digital signal transmitted from the input corrector 8 an input/output characteristic as a result of the density correction and/or contrast correction or the like or a linear input/output characteristic which has not as yet been corrected so that an image signal (image information) of n bits corresponding to one entered pixel is transmitted therefrom. With this image signal, the level can be expressed by 8 tone levels from "0" to "7". Reference numeral 10 represents a binary encoder capable of converting the pixel from a multi-valued information with which this pixel can be expressed by 3 bits into binary information with which the same can be expressed by 1 bit. This conversion is conducted in accordance with the image signal transmitted from the image reader 4 and an instruction signal of the various modes transmitted from an original mode setting switch 16 and image correction setting switch to be described hereinafter. In this binary encoder 10, reference numeral 11 represents a simple binary encoder capable of converting the 3-bit image signal transmitted from the image reader 4 into a binary information composed by black bits and white bits with reference to a predetermined threshold. This simple binary encoder 11 is used, for example when the character regions are binary-encoded.

Reference numeral 12 represents a dither processor capable of converting (binary encoding), in accordance with the dither method to be described hereinafter, the 3-bit image signal transmitted from the image reader 4 into an image signal which can be expressed by one bit. This dither processor 12 is used, for example, when image information of the photograph region is pseudo-contrast-transformed. Reference numeral 13 represents an image discriminator capable of identifying whether the subject pixel is the binary image region or the half tone image region in the conventional image region separating method using the input level of the subject pixel (3 bit image signal) transmitted from the image corrector 9 and the input level shown by the adjacent pixels. The thus-identified regions are separated. In this case, the description will be continued assuming that the binary image region is a character region, while the half-tone image region is a photograph region.

Reference numeral 14 represents a multiplexer, this multiplexer 14 selecting the binary image signal to be transmitted from the simple binary encoder 11 when the image discriminator 13 has determined that the subject region is a character region. This multiplexer 14 also selects the binary image signal to be transmitted from the dither processor 12 when the image discriminator 13 has determined that the subject region is a photograph region so that the thus-selected image signal is supplied to the ensuing multiplexer 15. Reference numeral 15 represents a multiplexer, this multiplexer 15 selects an output image signal to be supplied to the printer 20 in accordance with the original modes to be set to an original mode setting switch 16 to be described herein after. These original modes are arranged to be: a character mode for reading the original image formed by characters; a photograph mode for reading the original image formed by photograph, and a mixture mode for reading an original image in which the character region and the photograph region are mixed. This multiplexer 15 also selects the output from the simple binary encoder 11 when the mode is the character mode, output from the dither processor 12 when in the photograph mode, or output from the multiplexer 14 when in the mixture mode. The thus-selected binary image signal from each of the regions is inputted to this multiplexer 15 and a treatment for supplying the thus-inputted signal to the printer 20 is performed.

Next, reference numeral 16 represents an original mode setting switch capable of being manually set by a user to select from the character mode, the photograph mode and the mixture mode in accordance with the type of the original image to be read. This original mode setting switch 16 transmits a mode setting signal for identifying the original mode to the above-described input correction portion 8, the image corrector 9, the dither processor 12, and the multiplexer 15 in accordance with the original mode set before the original image is read. Reference numeral 17 represents an image correction setting switch 17. This image correction setting switch 17 is provided with the correction level of the density, contrast and so on which becomes the characteristics information of the output image by the user's manual operation before the original image is read. As a result, a correction setting signal corresponding to the correction level is transmitted from the image correction setting switch 17 to the image corrector 9, the simple binary encoder 11 and the dither processor 12 (from which the contrast adjustment is omitted).

Reference numeral 18 represents an input unit composed by a variety of keys and switches (omitted from illustration) such as numerous key commanding the number of prints and print key demanding print start or the like. Reference numeral 19 represents a display displaying information such as the number of prints inputted in the input unit 18 and stored in the buffer of the RAM 3. Reference numeral 20 represents a printer portion to which an image signal of 1 bit which has been binary-encoded and transmitted from the multiplexer 15 is inputted. Then, this printer 20 develops the thus-input 1 bit image signal over a bit map memory (omitted from illustration) and performs a printing action to recording paper. Reference numeral 21 represents a dither ROM 21 in which a dither pattern for performing binary encoding is stored, wherein the dither pattern is defined to be a pattern in which the threshold is arranged at the position of each dot in the dither matrix of 4×4 dots. This dither ROM 21 stores a dither pattern for binary encoding image information which has been subjected to the density or contrast correction and a dither pattern for the mixture mode which binary encodes the image information to be transmitted linearly and in a non-corrected state from the image reader 4. In particular, the dither pattern for the mixture mode includes correction information upon the light intensity-density conversion and the density adjustment.

Next, the dither treatment performed by the embodiment of the image processing apparatus will be described.

A pixel of the image signal of n (3) bits to be transmitted from the image corrector 9 is used as to be subjected to a comparison with each of the thresholds of the dither pattern. In the dither processor 12, a threshold for 16 pixels to be subjected to a comparison with the input level of the 16 (4×4 dots) pixels after the dither pattern has been read from the dither ROM 21. When the image signal for 4×4 dots is supplied from the image corrector 9 to the dither processor 12, each input level for the 16 pixels and each of the thresholds of the predetermined dither patterns are compared with each other so that the binary encoding is performed. That is, when the input level is the same as or larger than the threshold corresponding to the dither pattern, the pixel at the position of the thus-compared threshold is set to black color (expressed by bit "1").

Meanwhile, although the dither matrix according to this embodiment comprises a spiral type one, the present invention is not limited to this. Furthermore, the size of the dither matrix is not limited to 4×4 dots.

Figure 4:
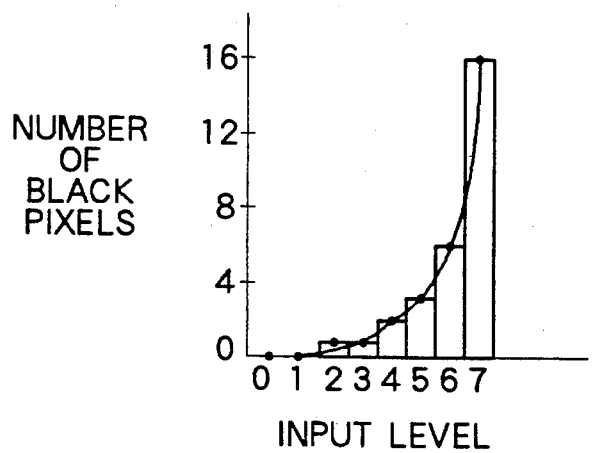
FIGS. 4 to 6 illustrate an example of input/output characteristics of a dither processing portion 12.
Figure 5:
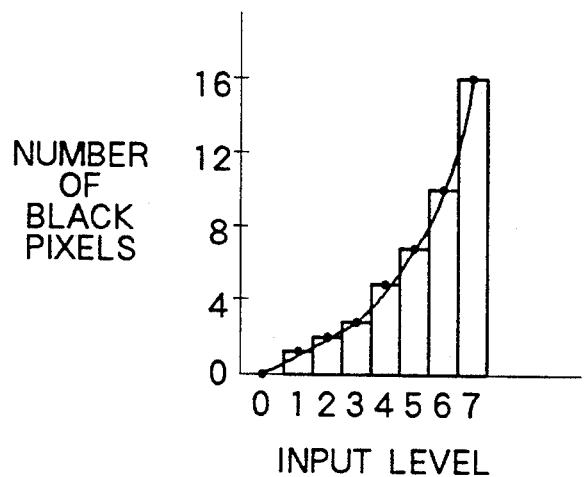
Figure 6:
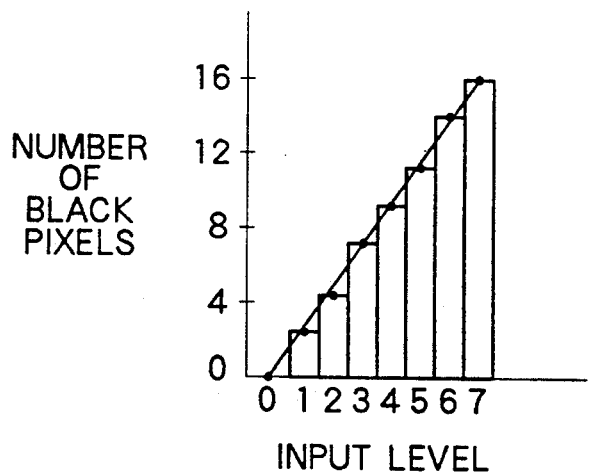
Figure 11A:
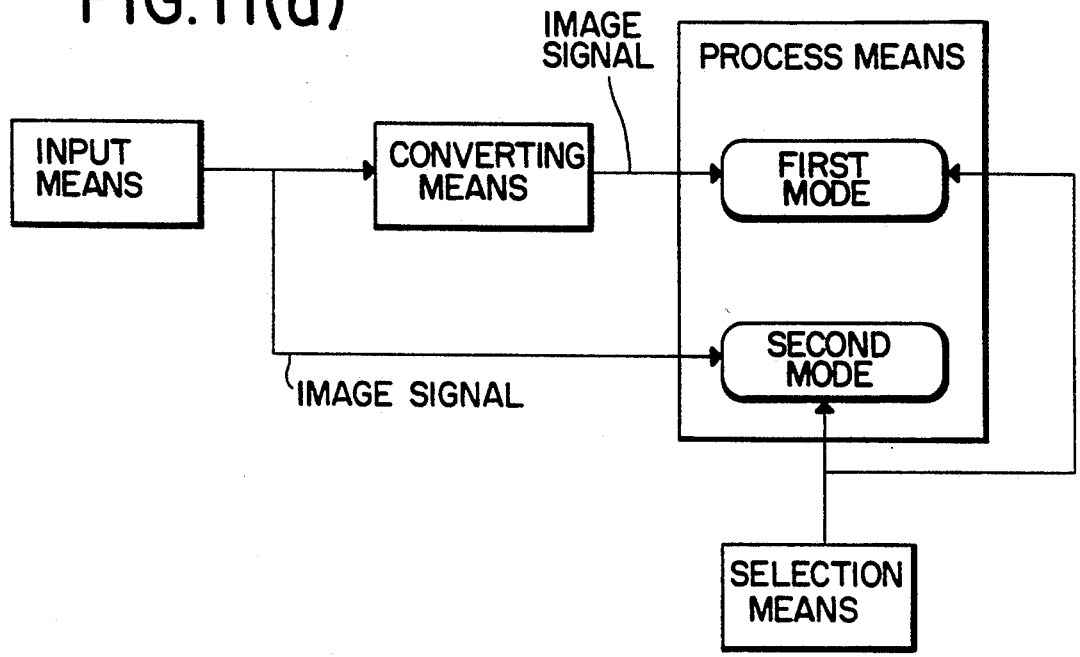
FIG. 11a is a block diagram of the inventive feature.
Figure 11B:
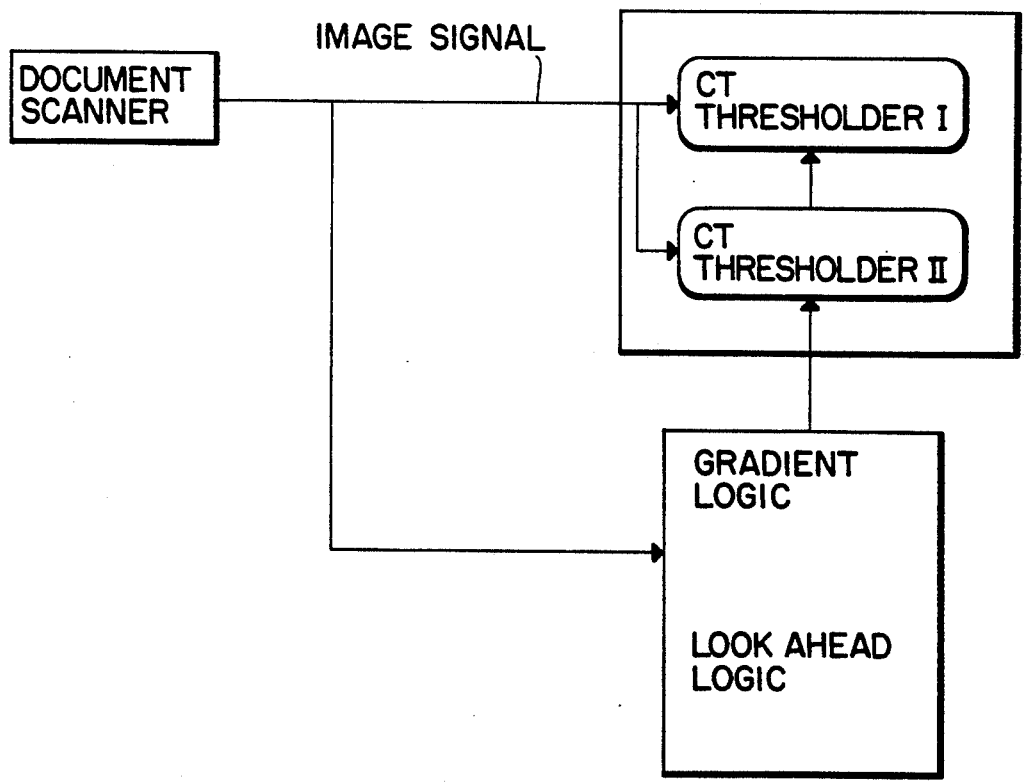
FIG. 11b is a block diagram of the prior art.

FIGS. 4 to 6 illustrate examples of the input/output characteristics for the dither processor 12. The input/output characteristics shown in FIGS. 4 to 6 indicate the number of black pixels to be transmitted from the dither processor 12 when the same input level image signals are inputted to the threshold for 16 pixels disposed on the dither matrix. Referring to FIGS. 4 to 6, the input level transmitted from the image reader 4 to the dither processor 12 should be read along the axis of abscissa, while the number of black pixels in the 16 pixels after subjected to the dither processing in according with each of the input level should be read along the axis of ordinates. The input/output characteristics above include the input/output characteristics depending upon light intensity-density conversion and density adjustment, for example, a characteristic that the density of the black pixels are increased from the state shown in FIG. 4 to FIG. 6 are shown.

An example of the dither pattern according to the present embodiment in which the most suitable dither processing is performed in the variety of the original modes (photograph mode and the mixture mode) will be described. An example of the mixture mode in which the dither pattern including correction information such as the conversion from the light intensity to the density will be described.

FIG. 7 illustrates an example of the dither pattern of 4×4 dots in which the thresholds having the input/output characteristics shown in FIG. 4 are arranged. FIG. 8 illustrates an example of the dither pattern of 4×4 dots in which the thresholds having the input/output characteristics shown in FIG. 5 are arranged. FIG. 9 illustrates an example of the dither pattern of 4×4 dots in which the thresholds having the input/output characteristics shown in FIG. 6 are arranged.

FIGS. 10A to 10C each illustrates the output transmitted from the dither processor 12 in a case where all of the levels of the outputs of each of the images of 4×4 dots to be compared with each of the dither patterns shown in FIGS. 7 to 9 are "4".

Referring to FIG. 10A, when all of the levels of the inputs are "4" and are compared with the dither pattern shown in FIG. 7, two black pixels are transmitted. It is as well apparent that there are two black pixels corresponding to the input level of "4" according to the above-described input/output characteristics shown in FIG. 4. Similarly, in the dither pattern shown in FIG. 8, four black pixels are transmitted as shown in FIG. 10B when all of the levels of the inputs are "4". On the other hand, with the dither pattern shown in FIG. 9, nine black pixels are transmitted.

As described above, it is possible to change the number of the black pixels and changing the density of the pixels to be transmitted by changing, for example, the dither pattern as shown in FIGS. 10A to 10C, using the dither pattern according to the determined density or the like even if all of the levels of the inputs of the pixels of 4×4 dots are the same. Therefore, the number of the black pixels which can meet the various original modes can be transmitted by using the above-described dither ROM 21.

Next, the operation of the image processing apparatus according to the present embodiment will be described.

Figure 2A:
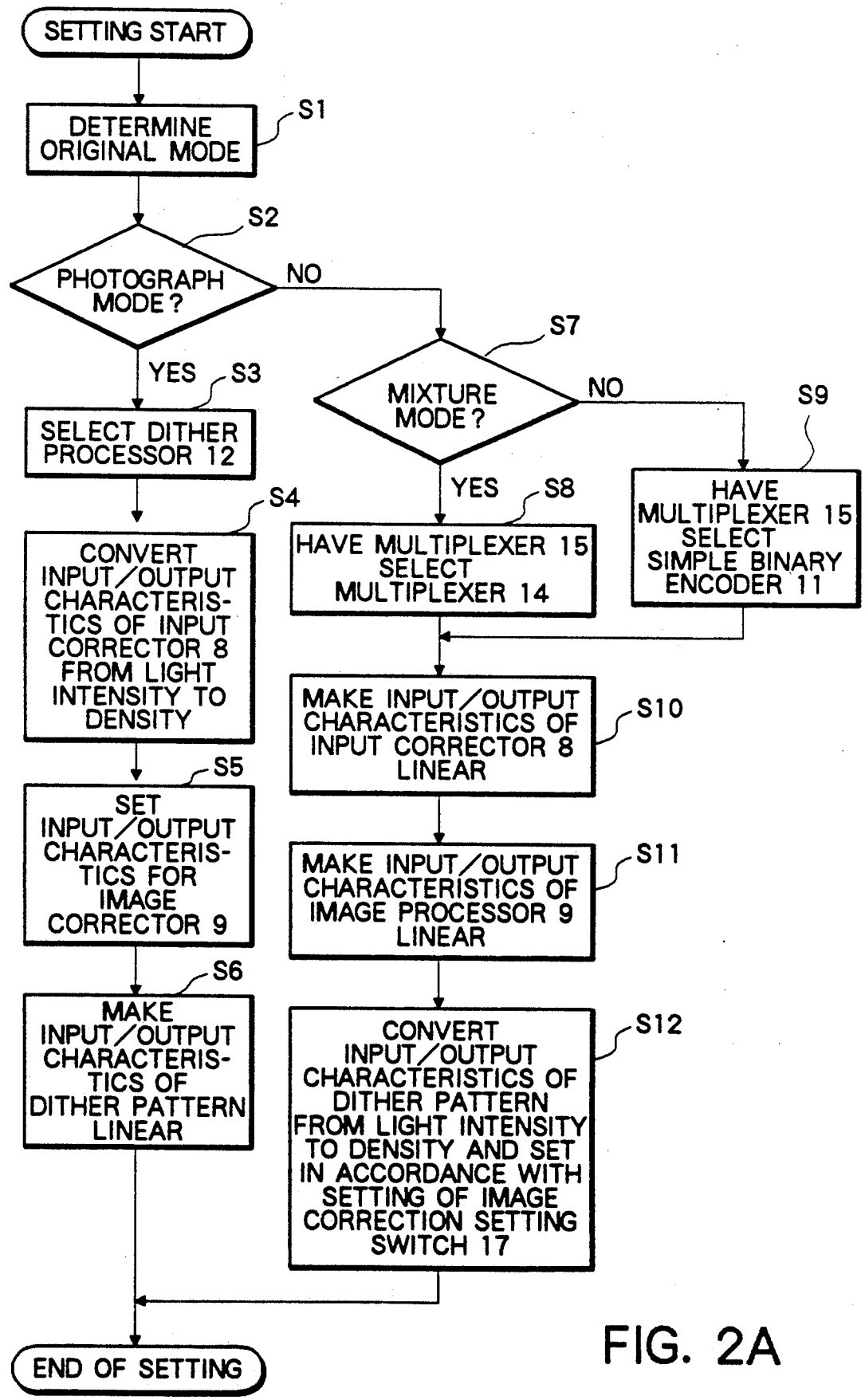
FIG. 2A is a flow chart which illustrates actions of the embodiment of the image processing apparatus in accordance with a variety of original modes.
Figure 2B:
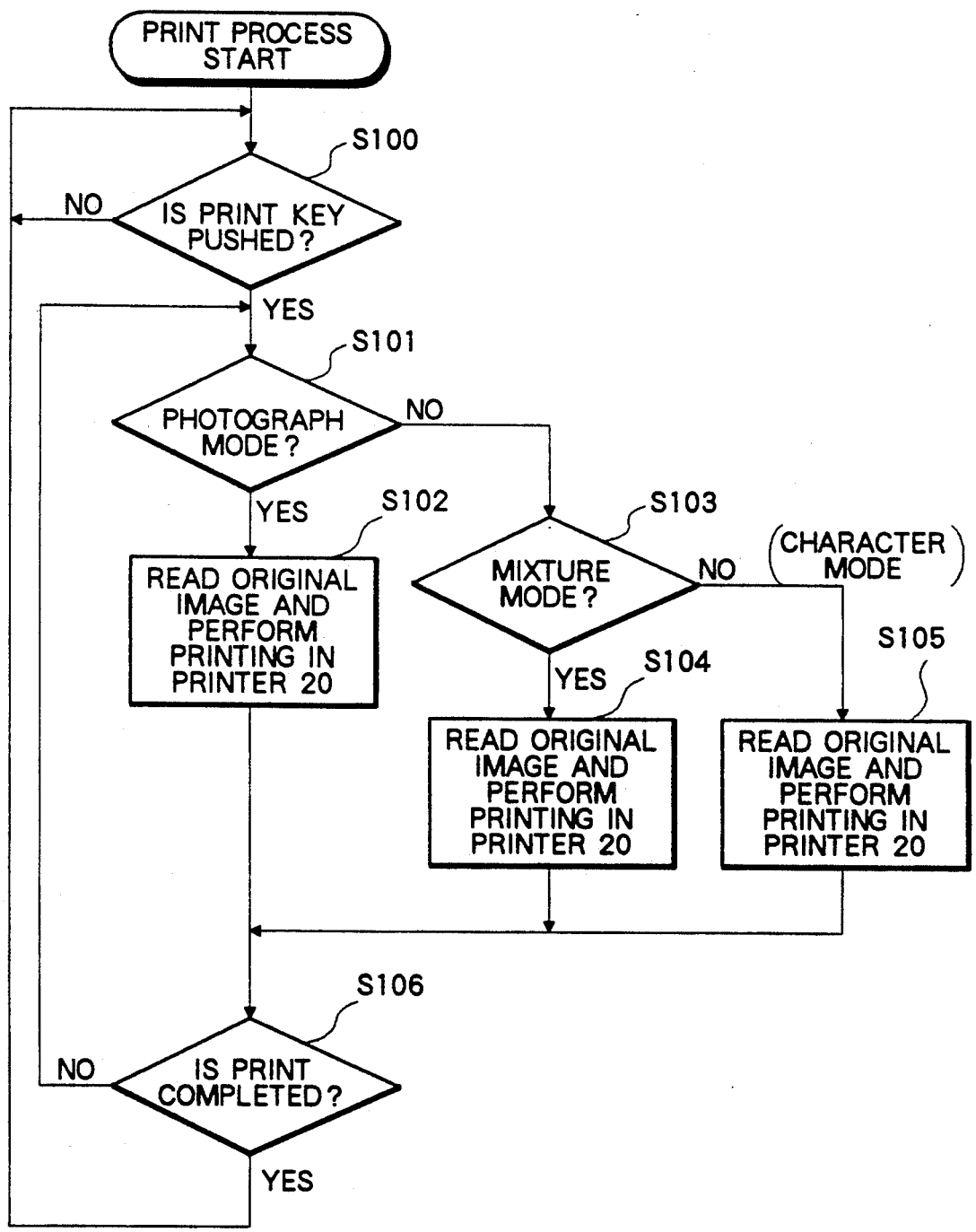
FIG. 2B is a flow chart illustrating a printing action of the embodiment of the image processing apparatus.

FIG. 2A is a flow chart which illustrates the setting operation of the various original modes provided for the image processing apparatus according to this embodiment. FIG. 2B is a flow chart which illustrates the printing operation of the image processing apparatus according to the present embodiment.

First, the setting operation according to each of the original modes will be described. The type of the original mode provided for the original mode setting switch 16 is determined (step S1) before the original image is read. If the determined result is the photograph mode, the output of the dither processor 12 is selected by the multiplexer 15. As a result of this switch, the output image signal from the multiplexer 15 is selected and a binary output image signal transmitted from the dither processor 12 is supplied to the printer 20 when printing is performed. Next, the input/output characteristic of the input corrector 8 is set to the characteristic for converting the light intensity to density (step S4). In addition, the input/output characteristics such as density and contrast are set for the image corrector 9 in accordance with the setting provided for the image correction setting switch 17 (step S5). Next, in order to dither-process the image signal in the dither processor 12, a setting is performed in which a dither pattern having a linear input/output characteristic without correction process is selected from the dither ROM 21 (step S6).

In the case where the original mode is determined to be the mixture mode in step S1, switching is performed so that the multiplexer 15 selects the output from the multiplexer 14 (step S8). In the case where the original mode is determined to be the character mode in step S1, switching is performed so that the multiplexer 15 selects the output from the simple binary encoder 11 (step S9). As described above, if the selection is instructed by the multiplexer 15 corresponding to the mixture mode or the character mode, the input/output characteristics of the input corrector 8 and the image corrector 9 are each set to a linear characteristics without correction (step 10 and step 11). Furthermore, a setting is performed (step S12) in order to perform the dither process in the dither processor 12 in which a dither pattern is selected from the dither ROM 21, this dither pattern including the input/output characteristics each of which corresponds to the characteristics in which the light intensity level is converted into the density level and the correction instruction determined for the image correction setting switch 17.

According to these setting process, suitable preparation is made for the printing according to this embodiment and corresponding to the photograph mode, mixture mode and the character mode.

First, whether the print key has been pushed or not is detected (step S100). If the print key has been pushed, the printing process corresponding to the type of the original mode determined before printing is started.

When the type of the original mode is set to the photograph mode, the image signal of the original image is read from the solid-state imaging device 5 in accordance with the pushing of the print key. Then, the input image signal from the solid-state imaging device 5 is converted in the A/D converter 6 into a digital signal of 3 bits. The thus-digitized image signal is subjected to a sensitivity uniforming correction for each device, in the characteristic corrector 7. Then, in this input corrector 8, the conversion from the light intensity level to the density level is, as shown in FIG. 3, performed in accordance with instruction of the original mode setting switch 16. In the next image corrector 9, correction corresponding to correction information such as the density and contrast or the like set by the image correction setting switch is performed. The thus-corrected image signal of 3 bits becomes the input level to be supplied to the ensuing binary encoder 10. When the image signal of the subject pixel to be transmitted from the image corrector 9 is inputted to the dither processor 12, a comparison with the dither pattern in which the input/output characteristics are set in a linear form is made. As a result, the thus-binarized image signal of 1 bit is transmitted. The image signal of 1 bit to be transmitted from this dither processor 12 is transmitted to the printer 20 by way of the multiplexer 15. As a result, the printer 20 prints the output image of the photograph region (half tone image) of the original which has been read with an excellent reproducibility maintained (step S102). when a suitable dither pattern is selected in the dither processor 12 from a plurality of dither patterns stored in the ROM 21, the address of the dither pattern to be selected is sent to the ROM 21.

Then, the process in a case where the mixture mode is set as the original mode will be described (step S103). In this case, the image signal of the original image which has been read by the solid-state imaging device 5 is converted into a digital signal in the A/D converter 6. The thus-obtained digital signal is further subjected to the characteristic correction process in the characteristic corrector 7. In the following input corrector 8 and the image corrector 9, no correction is performed since the characteristics are particularly set to a linear form as a result of the instruction through the original mode setting switch 16. Therefore, an image signal whose density or the like has not corrected is transmitted to the binary encoder 10. The image signal (input level) of n (3) bits which has been transmitted from the image corrector 9 is, as the subject pixel, subjected to a process in the image discrimination 13 in which the maximum difference from the input level of the pixels in the surrounding portions for each pixel. Then, the maximum difference and a predetermined threshold are then compared, and the determination whether the subject pixel is in the character region or the photograph region is determined. For example, if the maximum difference exceeds the threshold, the subject pixel is determined to be in the character region. The thus-obtained result becomes the selection signal for the purpose of transmitting the image signal by the multiplexer 14. That is, in the multiplexer 14, the result of the determination made by the image discrimination 13 is the characteristics region, the binary image signal to be transmitted from the simple binary encoder 11 is selected. If it is the photograph region, the binary image signal to be transmitted from the dither processor 12 is selected as to be transmitted to the ensuing multiplexer 15. In this time, the multiplexer has been instructed to select and transmit the output from the multiplexer 14 by the original mode setting switch 16. The binary image signal transmitted from the multiplexer 15 is supplied to the printer 20. If the mixture mode is set, the input from the multiplexer 14 has, as described referring to FIG. 2A, selected by the multiplexer 15 in the setting process. When the image signal is then transmitted from the multiplexer 15 to the printer 20, printing is, similarly to the above-described photograph case, performed (step S103 and step S104).

If the type of the original mode has been set to the character mode by the setting switch 16 the output from the simple binary encoder 11 is selected by the multiplexer 15, which selection differs from the mixture mode case. In this process, the output image signal from the simple binary encoder 11 is transmitted to the printer 20 so that characters of an excellent quality can be printed (step S103 and step S105).

As described above, in the mixture mode, the dither pattern including all of the correction characteristics which are not processed in the image reader 4 may be used. The proper correction and binarization can be performed by selecting a proper dither pattern from a plurality of dither patterns in accordance with information upon the type of the original mode and the image correction setting switch 17. In a case where the other corrections process are added, the dither pattern may include the contents of the correction as an alternative to the addition of the correction portion. Therefore, a variety of corrections can be performed with a simple structure of a low cost.

As described above, according to the present embodiment, when the original image is formed by mixing the character region and the photograph region, the character region and the photograph region are separated from each other by using the read image to which the correction treatment has not been applied in the input corrector 8 and the image corrector 9. Therefore, the separation of the photograph region and the character region can be correctly performed. By improving the identifying performance in the mixture mode between the photograph region and the character region of the original image, the photograph region and the character region of the output image can be properly and clearly reproduced. As a result, a image quality exhibiting an excellent reproducibility can be obtained. Furthermore, an image quality exhibiting an excellent reproducibility can be obtained with a simple structure by including correction information such as g conversion.

As a modification of this embodiment, characteristics such as contrast adjustment may be included in the dither pattern in addition to the density adjustment. In this case, only by adding a slight quantity of memories such as ROMs, the various corrections can be performed.

Although the image processing apparatus according to this embodiment is provided with the printing function, the present invention is not limited to this. It can be applied to communication processing apparatus such as facsimile within the scope of the thesis of the present invention. In this case, the signal processing such as compression or the like may be applied to the image signal transmitted from the multiplexer 15, and the result of this may be sent to the modem or the net control apparatus or the like.

What is claimed is:

1. An image processing apparatus comprising:
   (a) input means for inputting an image signal;
   (b) converting means for performing a predetermined conversion of the image signal input by said input means;
   (c) process means capable of performing a plurality of half-tone processings; and
   (d) selection means for selecting one of a first mode, to cause said process means to perform a first one of the half-tone processings on the image signal which has been converted by said converting means, and a second mode, to cause said process means to perform a second one of the half-tone processing, different from said first half-tone processing, on the image signal which has not been converted by said converting means.

2. An image processing apparatus according to claim 1, wherein said first half-tone processing is performed by using a dither method and said second half-tone processing is performed by using a single binarizing method.

3. An image processing apparatus according to claim 1, further comprising correction means for performing correction, on the basis of density level, of the image signal converted by said converting means, wherein said process means performs half-tone processing on the signal which has been corrected by said correction means.

4. An image processing apparatus according to claim 1, further comprising discriminating means for discriminating whether an image represented by the image signal input by said input means is a half-tone image or not.

5. An image processing apparatus comprising:
   (a) input means for inputting an image signal;
   (b) converting means for performing a predetermined conversion of the image signal input by said input means;
   (c) process means capable of performing a half-tone processings; and
   (d) selection means for selecting one of a first mode, to cause said process means to perform the half-tone processing on the image signal converted by said converting means, and a second mode, to cause said process means to perform half-tone processing on the image signal input by said input means without conversion by said converting means,
   wherein said converting means converts from a light quantity signal to a density signal.

6. An image processing apparatus comprising:
   (a) input means for inputting an image signal;
   (b) converting means for performing a predetermined conversion of the image signal input by said input means;
   (c) process means capable of performing a half-tone processings;
   (d) selection means for selecting one of a first mode, to cause said process means to perform the half-tone processing on the image signal converted by said converting means, and a second mode, to cause said process means to perform half-tone processing on the image signal input by said input means without conversion by said converting means; and
   correction means for performing correction, on the basis of density level, of the image signal converted by said converting means, wherein said process means performs half-tone processing on the signal which has been corrected by said correction means, wherein said correction means performs said correction in a case where said first mode is selected and does not perform said correction in a case where said second mode is selected.

7. An image processing apparatus comprising:
(a) input means for inputting an image signal;
(b) converting means for performing a predetermined conversion of the image signal input by said input means;
(c) process means for performing a half-tone processing; and
(d) selection means for selecting one of a first mode, to cause said process means to perform the half-tone processing on the image signal converted by said converting means, and a second mode, to cause said process means to perform half-tone processing on the image signal input by said input means without conversion by said converting means; and
discriminating means for discriminating whether an image represented by the image signal input by said input means is a half-tone image or not,
wherein said discriminating means performs its discrimination when the second mode is selected by said selection means.

8. An image processing apparatus according to claim 7, wherein said process means performs second half-tone processing on the basis of a result of said discrimination by said discriminating means.

9. An image processing apparatus comprising:
(a) first generating means for generating a light quantity signal;
(b) second generating means for generating a density signal;
(c) process means for performing half-tone processing; and
(d) selection means for selecting one of a first mode, to cause said process means to perform the half-tone processing on the light quantity signal generated by said first generating means, and a second mode, to cause said process means to perform the half-tone processing on the density signal generated by said generating means,
wherein said first generating means is an image reading means.

10. An image processing apparatus comprising:
(a) first generating means for generating a light quantity signal;
(b) second generating means for generating a density signal;
(c) process means capable of performing a plurality of half-tone processing; and
(d) selection means for selecting one of a first mode, to cause said process means to perform a first one of the half-tone processings on the light quantity signal generated by said first generating means, and a second mode, to cause said process means to perform a second one of the half-tone processings, different from said first half-tone processing, on the density signal generated by said second generating means.

11. An image processing apparatus according to claim 10, wherein said second generating means is a converting means for converting the light quantity signal generated by said first generating means into the density signal.

12. An image processing apparatus according to claim 10, wherein said first half-tone processing is performed by using a dither method and said second half-tone processing is performed by using a single binarizing method.

13. An image processing apparatus according to claim 10, further comprising discriminating means for discriminating whether an image represented by the signal generated by said first generating means is a half-tone image or not.

14. An image processing apparatus according to claim 13, wherein said discriminating means performs discrimination when the first mode is selected by said selection means.

15. An image processing apparatus according to claim 14, wherein said process means performs the half-tone processing on the basis of a result of said discrimination by said discriminating means.

16. An image processing apparatus comprising:
first input means for inputting correction information relating to an image signal;
second input means for inputting the image signal; and
encoding and correcting means for simultaneously correcting the image signal input by said second input means in accordance with the correction information input by said first input means, and binary encoding the image signal,
wherein said encoding and correcting means includes storage means for storing a plurality of dither patterns and selection means for selecting one of the dither patterns corresponding to the correction information,
wherein said encoding and correcting means performs correction of the image signal and binary encoding in accordance with the one dither pattern thus selected, and
wherein the dither patterns include conversion information for converting from a light quantity level to a density level.

17. An image processing apparatus comprising:
first input means for inputting correction information relating to an image signal;
second input means for inputting the image signal; and
encoding and correcting means for simultaneously correcting the image signal input by said second input means in accordance with the correction information input by said first input means, and binary encoding the image signal,
wherein said first input means is structured and arranged for inputting information indicating an original mode.

18. An image processing apparatus comprising:
(a) input means for inputting an image signal;
(b) converting means for performing predetermined conversion of the image signal input by said input means;
(c) process means capable of performing a plurality of half-tone processings;
(d) sending means for compressing and sending out the image signal output from said process means; and
(e) selection means for selecting one of a first mode, to cause said process means to perform a first one of the half-tone processings on the image signal which has been converted by said converting means, and a second mode, to cause said process means to perform a second one of the half-tone processings, different from said first half-tone processing, on the image signal which has not been converted by said converting means.

19. An image processing apparatus according to claim 18, wherein said sending means includes a modem.

20. An image processing apparatus according to claim 18, wherein said first half-tone processing is performed by using a dither method and said second half-tone processing is performed by using a single binarizing method.

21. An image processing apparatus according to claim 18, further comprising correction means for performing correction, on the basis of density level, of the image signal converted by said converting means, wherein said process means performs the half-tone processing on an output signal corrected by said correction means.

22. An image processing apparatus according to claim 18, further comprising discriminating means for discriminating whether an image represented by the image signal input by said input means is a half-tone image or not.

23. An image processing apparatus according to claim 22, wherein said discriminating means performs discrimination when the second mode is selected by said selection means.

24. An image processing apparatus according to claim 23, wherein said process means performs the half-tone processing on the basis of a result of said discrimination by said discriminating means.

25. An image processing apparatus comprising:
(a) input means for inputting an image signal;
(b) converting means for performing a predetermined conversion of the image signal input by said input means;
(c) process means capable of performing half-tone processing;
(d) sending means for compressing and sending out the image signal after the half-tone processing has been performed on the image signal by said process means; and
(e) selection means for selecting one of a first mode, to cause said process means to perform the half-tone processing on the image signal converted by said converting means, and a second mode, to cause said process means to perform the half-tone processing on the image signal input by said input means without conversion by said converting means,
wherein said converting means converts from a light quantity signal to a density signal.

26. An image processing apparatus comprising:
(a) input means for inputting an image signal;
(b) converting means for performing a predetermined conversion of the image signal input by said input means;
(c) process means for performing half-tone processing;
(d) sending means for compressing and sending out the image signal after the half-tone processing has been performed on the image signal by said process means; and
(e) selection means for selecting one of a first mode, to cause said process means to perform the half-tone processing on the image signal converted by said converting means, and a second mode, to cause said process means to perform the half-tone processing on the image signal input by said input means without conversion by said converting means; and
(f) correction means for performing correction, on the basis of density level, of the image signal converted by said converting means, wherein said process means performs the half-tone processing on an output signal corrected by said correction means,
wherein said correction means performs said correction in a case where said first mode is selected and does not perform said correction in a case where said second mode is selected.

27. An image processing apparatus comprising:
(a) input means for inputting an image signal;
(b) converting means for performing a predetermined conversion of the image signal input by said input means, said converting means converting from a light quantity signal to a density signal;
(c) process means for performing half-tone processing; and
(d) selection means for selecting one of a first mode, to cause said process means to perform a half-tone processing on the image signal which has been converted by said converting means, and a second mode, to cause said process means to perform the half-tone processing on the image signal input by said input means without conversion by said converting means.

28. An image processing apparatus according to claim 27, wherein said first half-tone processing is performed by using a dither method and second half-tone processing is performed by using a single binarizing method.

29. An image processing apparatus according to claim 27, further comprising correction means for performing correction, on the basis of density level, of the image signal converted by said converting means, wherein said process means performs the half-tone processing on the signal which has been corrected by said correction means.

30. An image processing apparatus according to claim 29, wherein said correction means performs said correction in a case where said first mode is selected an does not perform said correction in a case where said second mode is selected.

31. An image processing apparatus according to claim 27, further comprising discriminating means for discriminating whether an image represented by the image signal input by said input means is a half-tone image or not.

32. An image processing apparatus according to claim 31, wherein said discriminating means performs its discrimination when the second mode is selected by said selection means.

33. An image processing apparatus according to claim 32, wherein said process means performs the half-tone processing on the basis of a discriminating result obtained by said discriminating means.

34. An image processing apparatus comprising:
(a) image reading means for reading an image and generating a light quantity signal;
(b) second generating means for generating a density signal;
(c) process means for performing a half-tone processing; and (d) selection means for selecting one of a first mode, to cause said process means to perform the half-tone processing on the light quantity signal generated by said image reading means (and not on the density signal), and a second mode, to cause said process means to perform the half-tone processing on the density signal generated by said second generating means (and not on the light quantity signal).

35. An image processing apparatus according to claim 34, wherein said second generating means is a converting means for converting from the light quantity signal generated by said first generating means into the density signal.

36. An image processing apparatus according to claim 34, wherein the half-tone processing is performed in said first mode by using a dither method, and in said second mode by using a single binarizing method.

37. An image processing apparatus according to claim 34, further comprising discriminating means for discriminating whether an image represented by the signal generated by said image reading means is a half-tone image or not.

38. An image processing apparatus according to claim 37, wherein said discriminating means performs discrimination when the first mode is selected by said selection means.

39. An image processing apparatus according to claim 38, wherein said process means performs the half-tone processing on the basis of a discriminating result obtained by said discriminating means.

40. An image processing apparatus comprising:
(a) input means for inputting an image signal;
(b) converting means for performing a predetermined conversion of the image signal input by said input means, said converting means converting from a light quantity signal to a density signal;
(c) process means capable of performing a plurality of half-tone processings;
(d) sending means for compressing and sending out the image signal output from said process means; and
(e) selection means for selecting one of a first mode, to cause said process means to perform a first one of the half-tone processings on the image signal which has been converted by said converting means, and a second mode, to cause said process means to perform a second one of the half-tone processings, different said first half-tone processing, on the image signal which has not been converted by said converting means.

41. An image processing apparatus according to claim 40, wherein said sending means includes a modem.

42. An image processing apparatus according to claim 40, further comprising correction means for performing correction, on the basis of density level, of the image signal converted by said converting means, wherein said process means performs the half-tone processing on an output signal corrected by said correction means.

43. An image processing apparatus according to claim 40, further comprising discriminating means for discriminating whether an image represented by the image signal input by said input means is a half-tone processing image or not.

44. An image processing apparatus according to claim 43, wherein said discriminating means performs discrimination when the second mode is selected by said selection means.

45. An image processing apparatus according to claim 44, wherein said process means performs the half-tone processing on the basis of a result of said discrimination by said discriminating means.

46. An image processing apparatus according to claim 44, wherein the half-tone processing in the first mode is performed by using a dither method and the half-tone processing in the second mode is performed by using a single binarizing method.

47. An image processing apparatus comprising:
(a) input means for inputting an image signal;
(b) converting means for performing a predetermined conversion of the image signal input by said input means, said converting means converting from a light quantity to a density signal;
(c) process means for performing half-tone processing;
(d) sending means for compressing and sending out the image signal after the half-tone processing has been performed on the image signal by said process means; and
(e) selection means for selecting one of a first mode, to cause said process means to perform the half-tone processing on the image signal which has been converted by said converting means, and a second mode, to cause said process means to perform the half-tone processing on the image signal input by said input means without conversion by said converting means; and
(f) correction means for performing correction, on the basis of density level, of the image signal converted by said converting means,
wherein said process means performs the half-tone processing on an output signal corrected by said correction means and wherein said correction means performs said correction in a case where said first mode is selected and does not perform said correction in a case where said second mode is selected.

* * * * *

UNITED STATES PATENT AND TRADEMARK OFFICE
CERTIFICATE OF CORRECTION

PATENT NO. : 5,321,523
DATED : June 14, 1994
INVENTOR(S) : YASUNORI HASHIMOTO

Page 1 of 4

It is certified that error appears in the above-identified patent and that said Letters Patent is hereby corrected as shown below:

Title page,

AT [30] FOREIGN APPLICATION PRIORITY DATA

"Nov. 3, 1988 [JP]  Japan .......... 63-056303
Nov. 3, 1988 [JP]  Japan .......... 63-056304"
should read
--March 11, 1988 [JP]  Japan .......... 63-056303
  March 11, 1988 [JP]  Japan .......... 63-056304--.

AT [57] ABSTRACT

Line 2, "the" should read --an--.
Line 3, "the" should be deleted.
Line 6, "the" (second occurrence) should be deleted.

COLUMN 1

Line 31, "a" should read --an--.
Line 35, "a" (second occurrence) should read --an--.
Line 48, "comparison" should read --a comparison--.

COLUMN 2

Line 4, "assignment" should be deleted.
Line 5, "disclosures" should be deleted.
Line 35, "half tone" should read --half-tone--.
Line 38, "is" should read --there is--.
Line 51, "provided" should read --provides--.

UNITED STATES PATENT AND TRADEMARK OFFICE
CERTIFICATE OF CORRECTION

PATENT NO. : 5,321,523
DATED : June 14, 1994
INVENTOR(S) : YASUNORI HASHIMOTO

It is certified that error appears in the above-identified patent and that said Letters Patent is hereby corrected as shown below:

COLUMN 3

Line 22, "and" should be deleted.
Line 23, "illustrates" should read --illustrate--.
Line 25, "modes." should read --modes;--.
Line 26, "feature." should read --feature; and--.

COLUMN 4

Line 45, "half" should read --half- --.
Line 67, "herein" should read --herein- --.

COLUMN 6

Line 27, "accord-" should read --accordance--.
Line 28, "ing" should be deleted.

COLUMN 7

Line 53, "characteristics" should read --characteristic-- and "(step 10" should read --(step S10--.
Line 54, "step 11)." should read --step S11).--.

COLUMN 8

Line 30, "(half tone" should read --(half-tone--.
Line 32, "when" should read --When--.
Line 48, "corrected" should read --been corrected--.

UNITED STATES PATENT AND TRADEMARK OFFICE
CERTIFICATE OF CORRECTION

PATENT NO. : 5,321,523
DATED : June 14, 1994
INVENTOR(S) : YASUNORI HASHIMOTO

It is certified that error appears in the above-identified patent and that said Letters Patent is hereby corrected as shown below:

COLUMN 9

Line 7, "se-" should read --been se- --.
Line 14, "switch 16" should read --switch 16,--.
Line 29, "corrections" should read --correction--.
Line 47, "a image" should read --an image--.
Line 66, "net" should read --network--.

COLUMN 10

Line 39, "processings;" should read --processing;--.
Line 55, "capable of" should read --for--.
Line 56, "processings;" should read --processing;--.
Line 65, "correction means" should read
   --(e) correction means--.

COLUMN 11

Line 22, "discriminating means" should read
   --(e) discriminating means--.
Line 54, "processing;" should read -processings;--.

COLUMN 13

Line 38, "capable of" should read --for--.

COLUMN 14

Line 33, "second" should read --said second--.
Line 45, "an" should read --and--.

UNITED STATES PATENT AND TRADEMARK OFFICE
CERTIFICATE OF CORRECTION

PATENT NO. : 5,321,523
DATED : June 14, 1994
INVENTOR(S) : YASUNORI HASHIMOTO

It is certified that error appears in the above-identified patent and that said Letters Patent is hereby corrected as shown below:

<u>COLUMN 16</u>

Line 22, "claim 44," should read --claim 45,--.

Signed and Sealed this

Eighteenth Day of April, 1995

*Attest:*

BRUCE LEHMAN

*Attesting Officer*    *Commissioner of Patents and Trademarks*